United States Patent
US 12,088,107 B2
Ohtsuki et al.
Sep. 10, 2024

(54) CONTROL SYSTEM, POWER SYSTEM, CONTROL METHOD, AND PROGRAM

(71) Applicant: PANASONIC INTELLECTUAL PROPERTY MANAGEMENT CO., LTD., Osaka (JP)

(72) Inventors: Yousuke Ohtsuki, Kyoto (JP); Hiroaki Yuasa, Osaka (JP); Yasuhiro Matsuda, Osaka (JP); Satoshi Sugimoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 142 days.

(21) Appl. No.: 17/297,954

(22) PCT Filed: Oct. 16, 2019

(86) PCT No.: PCT/JP2019/040734
§ 371 (c)(1),
(2) Date: May 27, 2021

(87) PCT Pub. No.: WO2020/110494
PCT Pub. Date: Jun. 4, 2020

(65) Prior Publication Data
US 2022/0094168 A1 Mar. 24, 2022

(30) Foreign Application Priority Data
Nov. 30, 2018 (JP) ................. 2018-226065

(51) Int. Cl.
*H02J 3/38* (2006.01)
*H02M 7/44* (2006.01)

(52) U.S. Cl.
CPC .............. *H02J 3/388* (2020.01); *H02M 7/44* (2013.01); *H02J 2300/24* (2020.01)

(58) Field of Classification Search
CPC .................. H02J 3/388; H02M 7/44
See application file for complete search history.

(56) References Cited

U.S. PATENT DOCUMENTS

2013/0169064 A1 7/2013 Park et al.
2016/0226255 A1 8/2016 Sugeno et al.

FOREIGN PATENT DOCUMENTS

| JP | 2001008380 A | * | 1/2001 | ....... B60L 11/1816 |
| JP | 2013-070585 A | | 4/2013 | |

(Continued)

OTHER PUBLICATIONS

International Search Report and Written Opinion issued in Internatoinal Patent Application No. PCT/JP2019/040734, dated Dec. 3, 2019; with partial English translation.

(Continued)

*Primary Examiner* — Daniel Cavallari
(74) *Attorney, Agent, or Firm* — Rimon P.C.

(57) ABSTRACT

The power conversion system includes an inverter circuit. The inverter circuit performs a grid-connected operation and an independent operation. When performing the independent operation, the inverter circuit may output, via a terminal, AC power converted to a load disconnected from a power grid. When the inverter circuit performs the independent operation, a control unit controls, when operating in a first mode, the power conversion system in a first time range such that an AC voltage is applied to the terminal, and controls, when operating in a second mode, the power conversion system in a second time range different from the first time range. The second mode includes control of stopping an operation of having the AC voltage applied to the terminal.

12 Claims, 5 Drawing Sheets

(56) References Cited

FOREIGN PATENT DOCUMENTS

| | | |
|---|---|---|
| JP | 2013-162717 A | 8/2013 |
| JP | 2015-128339 A | 7/2015 |
| JP | 2018-038229 A | 3/2018 |
| JP | 2018-098820 A | 6/2018 |
| WO | 2012/033254 A1 | 3/2012 |

OTHER PUBLICATIONS

Notification of First Office Action dated Jun. 26, 2024 issued in the corresponding Chinese Patent Application No. 201980078900.9, with English translation.

* cited by examiner

CONTROL SYSTEM, POWER SYSTEM, CONTROL METHOD, AND PROGRAM

CROSS-REFERENCE OF RELATED APPLICATIONS

This application is the U.S. National Phase under 35 U.S.C. § 371 of International Patent Application No. PCT/JP2019/040734, filed on Oct. 16, 2019, which in turn claims the benefit of Japanese Application No. 2018-226065, filed on Nov. 30, 2018, the entire disclosures of which Applications are incorporated by reference herein.

TECHNICAL FIELD

The present disclosure generally relates to a control system, a power system, a control method, and a program. More particularly, the present disclosure relates to a control system for controlling a power conversion system, a power system including the control system, a control method, and a program.

BACKGROUND ART

Patent Literature 1 discloses a power conversion system including a power conditioner unit, a photovoltaic cell, a storage battery, and a system control unit. When the power grid falls into a blackout state due to a failure, a disaster, or any other cause, the blackout detection function of the system control unit is activated to decide that a blackout should have been triggered. While a decision is made that the blackout persists, the power conditioner unit performs an independent operation. When the independent operation is started, power starts to be supplied from the power conditioner unit to only a particular load.

In the power conversion system of Patent Literature 1, however, once the independent operation has been started, a voltage is applied continuously from the power conditioner unit to an electric circuit connected to the particular load, even while the particular load is consuming no power. Thus, the power conditioner unit consumes, in vain, the power supplied from either the photovoltaic cell or the storage battery even in such a situation.

CITATION LIST

Patent Literature

Patent Literature 1: JP 2018-098820 A

SUMMARY OF INVENTION

It is therefore an object of the present disclosure to provide a control system, a power system, a control method, and a program, all of which are configured or designed to cut down the power consumption of a power conversion system.

A control system according to an aspect of the present disclosure includes a control unit for controlling a power conversion system. The power conversion system includes an inverter circuit. The inverter circuit performs a grid-connected operation and an independent operation. When performing the grid-connected operation, the inverter circuit is allowed to convert DC power supplied from a DC power supply into AC power and output the AC power thus converted to a power grid. When performing the independent operation, the inverter circuit is allowed to output, via a terminal, the AC power converted to a load disconnected from the power grid. When the inverter circuit performs the independent operation, the control unit controls, when operating in a first mode, the power conversion system in a first time range such that an AC voltage is applied to the terminal, and controls, when operating in a second mode, the power conversion system in a second time range different from the first time range. The second mode includes control of stopping an operation of having the AC voltage applied to the terminal.

A power system according to another aspect of the present disclosure includes the control system and the power conversion system.

A control method according to still another aspect of the present disclosure is a control method for controlling a power conversion system. The power conversion system includes an inverter circuit. The inverter circuit performs a grid-connected operation and an independent operation. When performing the grid-connected operation, the inverter circuit is allowed to convert DC power supplied from a DC power supply into AC power and output the AC power thus converted to a power grid. When performing the independent operation, the inverter circuit is allowed to output, via a terminal, the AC power converted to a load disconnected from the power grid. This control method includes controlling, when the inverter circuit performs the independent operation, the power conversion system differently in a first time range and in a second time range, which is different from the first time range. Specifically, the control method includes: controlling, in the first time range, the power conversion system in a first mode in which an AC voltage is applied to the terminal; and controlling, in the second time range, the power conversion system in a second mode including control of stopping an operation of having the AC voltage applied to the terminal.

A program according to yet another aspect of the present disclosure causes a computer system to perform the control method.

DESCRIPTION OF EMBODIMENTS

A control system, power system, control method, and program according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure.

A power system 1 according to an exemplary embodiment may be used, for example, in facilities, such as schools and public halls, for use as shelters at the outbreak of a disaster, for example. In addition, the power system 1 may also be used by various types of customers including respective dwelling units of a multi-family dwelling house, single-family dwelling houses, factories, railway stations, commercial facilities, and offices.

Figure 1:
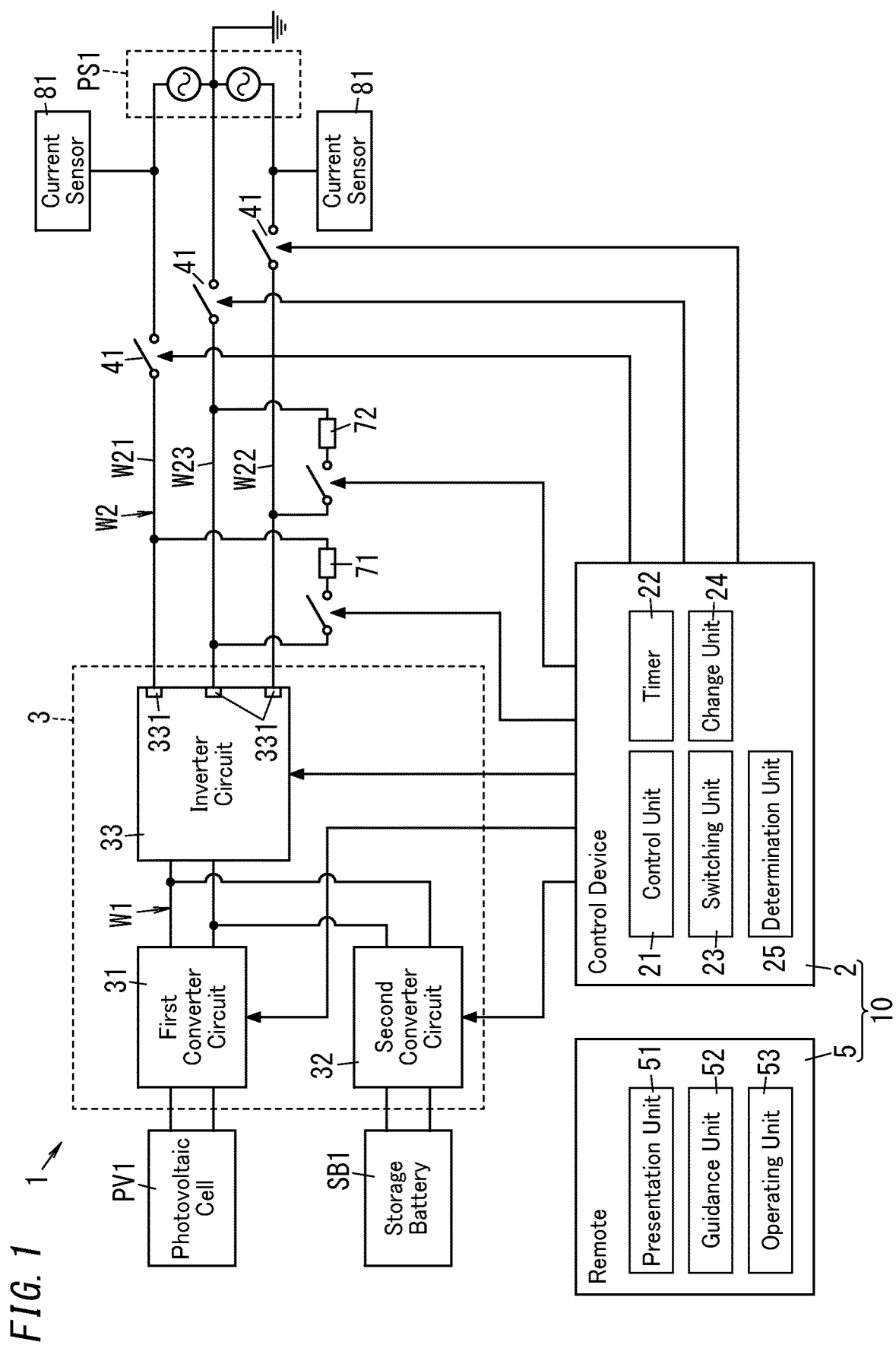
FIG. 1 is a block diagram of a power system according to one embodiment.

As shown in FIG. 1, the power system 1 includes: a control system 10 including a control device 2; and a power conversion system 3. The power system 1 further includes a photovoltaic cell PV1 serving as a power generation facility and a storage battery SB1. Examples of the storage battery SB1 include lithium-ion storage batteries, nickel-hydrogen storage batteries, lead storage batteries, electric double layer capacitors, and lithium-ion capacitors.

The power conversion system 3 is electrically connected to a power grid PS1 and a plurality of (e.g., two in the example illustrated in FIG. 1) loads 71, 72. The power grid PS1 and the power conversion system 3 are connected together via a single-phase three-wire electric circuit. The plurality of loads 71, 72 may be electrical devices, for example. The plurality of loads 71, 72 are supplied with power by at least one of the power grid PS1 or the power conversion system 3.

When a blackout is caused, for example, the supply of power from the power grid PS1 to the plurality of loads 71, 72 is cut off. In that case, the power system 1 changes, according to various conditions such as the time range and the operating state of the photovoltaic cell PV1, a state in which power is supplied from the power conversion system 3 to the plurality of loads 71, 72 into a state in which no power is supplied from the power conversion system 3 to the plurality of loads 71, 72, and vice versa. Next, the configuration of the power system 1 will be described in further detail.

The power conversion system 3 includes a first converter circuit 31, a second converter circuit 32, and an inverter circuit 33. Output terminals of the first converter circuit 31 are electrically connected to the second converter circuit 32 and the inverter circuit 33. In addition, input terminals of the first converter circuit 31 are electrically connected to the photovoltaic cell PV1. First input/output terminals of the second converter circuit 32 are electrically connected to the first converter circuit 31 and the inverter circuit 33. Furthermore, second input/output terminals of the second converter circuit 32 are electrically connected to the storage battery SB1. In the following description, an electrical path electrically connecting the first converter circuit 31, the second converter circuit 32, and the inverter circuit 33 to each other will be hereinafter referred to as an "electrical path W1." The electrical path W1 includes a non-grounded line and a grounded line.

The first converter circuit 31 includes a step-up chopper circuit, for example. The second converter circuit 32 includes a step-up/down chopper circuit, for example, and is implemented as a bidirectional converter circuit. The first converter circuit 31 converts a DC voltage input from the photovoltaic cell PV1 into a DC voltage of predetermined magnitude and outputs the DC voltage thus converted to the electrical path W1. The DC power output from the first converter circuit 31 to the electrical path W1 is input to the second converter circuit 32 or the inverter circuit 33. The second converter circuit 32 converts a DC voltage input from the storage battery SB1 into a DC voltage of predetermined magnitude and outputs the DC voltage thus converted to the electrical path W1. In this case, the storage battery SB1 discharges. In addition, the second converter circuit 32 converts a DC voltage input from electrical path W1 to a DC voltage of predetermined magnitude, and outputs the DC voltage thus converted to the storage battery SB1. In this case, the storage battery SB1 is charged.

The inverter circuit 33, for example, is a full-bridge inverter circuit. The inverter circuit 33 converts the DC power input from the electrical path W1 into AC power. The converted AC power is output from a plurality (e.g., three in the example shown in FIG. 1) of terminals 331 of the inverter circuit 33. The plurality of terminals 331 are electrically connected to the power grid PS1 and the plurality of loads 71, 72. In summary, the inverter circuit 33 converts the DC power supplied from the photovoltaic cell PV1 and the storage battery SB1, each of which serves as a DC power supply, into AC power, and outputs the AC power from the plurality of terminals 331.

The inverter circuit 33 performs a grid-connected operation and an independent operation. The grid-connected operation and the independent operation may be switched in accordance with the user's command. When performing the grid-connected operation, the inverter circuit 33 is electrically connected to the power grid PS1 and is able to output the converted AC power to the power grid PS1. Moreover, when performing the grid-connected operation, the inverter circuit 33 is able to convert the AC power input from the power grid PS1 into DC power. The converted DC power is output to the electrical path W1 and supplied to the storage battery SB1 via the second converter circuit 32. On the other hand, when performing the independent operation, the inverter circuit 33 is able to output the converted AC power to the plurality of loads 71, 72 via the plurality of terminals 331.

In other words, the plurality of loads 71, 72 are power-supplied from the power grid PS1 when the inverter circuit 33 performs the grid-connected operation. On the other hand, the plurality of loads 71, 72 are power-supplied from the inverter circuit 33 when the inverter circuit 33 performs the independent operation. Apart from the plurality of loads 71, 72, a load that is power-supplied from the power grid PS1 when the inverter circuit 33 performs the grid-connected operation, and not power-supplied when the inverter circuit 33 performs the independent operation may be electrically connected to the power grid PS1. Moreover, it is not always necessary for the plurality of loads 71, 72 to be electrically connected to the power grid PS1. In other words, when the inverter circuit 33 performs the grid-connected operation, it is not always necessary for the plurality of loads 71, 72 to be power-supplied from the power grid PS1.

An electrical path W2 between the plurality of terminals 331 of the inverter circuit 33 and the power grid PS1 is, for example, an electrical path of a single-phase three-wire system. In other words, the electrical path W2 includes an L1-phase wire W21, an L2-phase wire W22, and an N-phase wire W23. The plurality of loads 71, 72 are electrically connected to the electrical path W2. The power system 1 includes a plurality (e.g., three in the example shown in FIG. 1) of the interrupter units 41 which are provided one by one for the wires W21-W23. Each interrupter unit 41 includes, for example, an electromagnetic switch. Each interrupter unit 41 opens and closes the electrical path W2 under the control of the control device 2. When a failure occurs in the power distribution equipment of the power grid PS1, or when an overcurrent or a leakage current flows through the electrical path W2 to have the control device 2 open each interrupter unit 41, power supply to the plurality of loads 71, 72 from the power grid PS1 stops. In this case, the user may have power supplied to the plurality of loads 71, 72 from the inverter circuit 33 by operating a remote controller (remote 5; to be described later) to make the inverter circuit 33 start the independent operation.

The power system 1 further includes a plurality (e.g., two in the example shown in FIG. 1) of current sensors 81. Each of the plurality of current sensors 81 includes, for example, a current transformer. The plurality of current sensors 81 detect a current flowing through the electrical path W2, and output detection results to the control device 2. In the present embodiment, one current sensor 81 out of the two current sensors 81 detects the current flowing through the wire W21, and the other current sensor 81 detects the current flowing through the wire W22. In the control device 2, it is determined, based on the detection results of the plurality of current sensors 81, whether or not the power supply to the plurality of loads 71, 72 from the power grid PS1 is stopped.

The control device 2 includes, as its major constituent element, a microcontroller including one or more processors and one or more memories. That is to say, the function of the control device 2 is performed by making the processor of the microcontroller execute a program stored in the memory of the microcontroller. The program may be stored in advance in the memory, downloaded via a telecommunications line such as the Internet, or distributed after having been stored in a non-transitory storage medium such as a memory card.

The control device 2 includes a control unit 21. The control unit 21 controls the power conversion system 3. In detail, when the inverter circuit 33 performs the independent operation, the control unit 21 controls, in a first time range, the power conversion system 3 in a first mode. When the inverter circuit 33 performs the independent operation, the control unit 21 controls, in a second time range different from the first time range, the power conversion system 3 in a second mode. As used herein, "a second time range different from the first time range" means that the first time range and the second time range do not overlap with each other. For example, when the first time range is from 0:00 a.m. to 2:00 p.m., the second time range is a time range having a predetermined length and included in the time range from 2:00 p.m. to 0:00 a.m., e.g., the time range from 2:00 p.m. to 8:00 p.m.

In the first mode, the control unit 21 has the AC voltage applied across the plurality of terminals 331. The control performed by the control unit 21 in the second mode includes the control of stopping the operation of having the AC voltage applied across the plurality of terminals 331. In detail, when the control unit 21 is in the first mode, the control unit 21 controls the first converter circuit 31 to have the DC voltage supplied from the photovoltaic cell PV1 converted into a DC voltage of predetermined magnitude and have the DC voltage output to the inverter circuit 33. Moreover, when the control unit 21 is in the first mode, the control unit 21 controls the second converter circuit 32 to have the operation mode of the storage battery SB1 switched from charging to discharging, and vice versa. In addition, when the control unit 21 is in the first mode, the control unit 21 controls the inverter circuit 33 to have the DC voltage which is input to the inverter circuit 33 from the electrical path W1 converted into an AC voltage and have the AC voltage applied across the plurality of terminals 331.

In the second mode, the control unit 21 controls the inverter circuit 33 to make the inverter circuit 33 stop operating. As a result, no AC voltage will be applied across the plurality of terminals 331.

The first time range and the second time range may be set in accordance with the user's command or may be automatically set by the control device 2. For example, the time range from daytime to before midnight is set as the first time range. For example, the time range from midnight to early morning is set as the second time range. In comparison with the first time range, the second time range is a time range in which power is less likely to be consumed by the plurality of loads 71, 72.

At least for some period within the second time range, a power switch of the plurality of loads 71, 72 may be turned off and the plurality of loads 71, 72 may consume no power, even if the AC voltage is applied across the plurality of terminals 331. Thus, in the second time range, the control unit 21 operates in the second mode to stop the operation of having AC voltage applied across the plurality of terminals 331. Therefore, in the second time range, the power consumption of the power conversion system 3 may be reduced, compared to a situation when the AC voltage is applied across the plurality of terminals 331 even though no power is consumed by the plurality of loads 71, 72.

When the inverter circuit 33 is performing the grid-connected operation, the control unit 21 operates regardless of whether the current time is in the first time range or the second time range. When the inverter circuit 33 is performing the grid-connected operation, the control unit 21, for example, makes the power conversion system 3 perform at least one of the following first to fifth operations. When making the power conversion system 3 perform the first operation, the control unit 21 has the power supplied to the storage battery SB1 from the photovoltaic cell PV1 through the power conversion system 3. When making the power conversion system 3 perform the second operation, the control unit 21 has the power supplied to the plurality of loads 71, 72 from the photovoltaic cell PV1 through the power conversion system 3. When making the power conversion system 3 perform the third operation, the control unit 21 has the power supplied to the plurality of loads 71, 72 from the photovoltaic cell PV1 through the power conversion system 3 and has surplus electricity of the photovoltaic cell PV1 supplied to the storage battery SB1. When making the power conversion system 3 perform the fourth operation, the control unit 21 has the power supplied to the plurality of loads 71, 72 from the storage battery SB1 through the power conversion system 3. When making the power conversion system 3 perform the fifth operation, the control unit 21 has the power supplied to the storage battery SB1 from the power grid PS1 through the power conversion system 3.

The details of the third operation are as follows. When the third operation is performed, if the output power of the photovoltaic cell PV1 is less than or equal to the power consumption of the plurality of loads 71, 72, the control unit 21 has the power supplied to the plurality of loads 71, 72 from the photovoltaic cell PV1 through the power conversion system 3. Moreover, when the third operation is performed, if the output power of the photovoltaic cell PV1 exceeds the power consumption of the plurality of loads 71, 72, the control unit 21 has the power supplied to the plurality of loads 71, 72 from the photovoltaic cell PV1 through the power conversion system 3 and has surplus electricity supplied to the storage battery SB1. The surplus electricity is a difference between the output power of the photovoltaic cell PV1 and the power consumption of the plurality of loads 71, 72.

Furthermore, in the second time range (in other words, when the control unit 21 is operating in the second mode), if the photovoltaic cell PV1 as the power generation facility is outputting DC power, the control unit 21 has the DC power supplied to the storage battery SB1 from the photovoltaic cell PV1. In other words, in this case, the control unit 21 stops the operation of the inverter circuit 33 while allowing the first converter circuit 31 and the second converter circuit 32 to continue to operate.

In the control unit 21, apart from the first time range and the second time range, a time range for determining the operation of the power system 1 when the inverter circuit 33 is performing the grid-connected operation may be set. For example, when the inverter circuit 33 is performing the grid-connected operation, the control unit 21 may charge the storage battery SB1 during a third time range and discharge the storage battery SB1 during a fourth time range. Each of the third time range and the fourth time range may be the same as, or different from, the first time range or the second time range. Each of the third time range and the fourth time range may be set in accordance with the user's command or may be automatically set by the control device 2.

Moreover, in the second time range, if the photovoltaic cell PV1 as the power generation facility stops the output of the DC power (power generation), it is preferable to stop not only the inverter circuit 33, but also the first converter circuit 31 and the second converter circuit 32.

Furthermore, at least one of the first time range or the second time range is set on a predetermined period basis. The predetermined period is, for example, at least one of a date, a day of the week, a month, or a season, etc. As a result, at least one of the first time range or the second time range may be set according to the power demand in each predetermined period. For example, the daytime may be the second time range on weekdays and may be the first time range on holidays. Moreover, for example, in summer and winter when an air conditioner is used relatively frequently, the first time range may be extended compared to spring and fall. The setting for each predetermined period may be determined in accordance with the user's command or may be automatically determined by the control device 2.

The control device 2 includes a timer 22. The timer 22 measures the current time. Based on the time measured by the timer 22, the control unit 21 determines whether or not the current time is in the first time range and determines whether or not the current time is in the second time range.

The control device 2 includes a switching unit 23. The switching unit 23 switches the control unit 21 between two operation states that are a first state and a second state. In the first state, the control unit 21 operates in the first mode in the first time range and operates in the second mode in the second time range. In the second state, the control unit 21 operates only in the first mode, out of the first mode and the second mode. The switching unit 23 may switch the first state and the second state in accordance with the user's command or may automatically switch the first state and the second state.

The control device 2 includes a change unit 24. The change unit 24, for example, obtains weather information through a telecommunication line. The change unit 24 changes at least one of the first time range or the second time range according to the weather information. For example, if the weather forecast predicts a fair weather and the amount of insolation is expected to be relatively large, the amount of electricity produced by the photovoltaic cell PV1 is expected to be relatively large, and therefore, the change unit 24 extends the length of the first time range and shortens the length of the second time range. On the other hand, for example, if the weather forecast predicts a rain and the amount of insolation is expected to be relatively small, the amount of electricity produced by the photovoltaic cell PV1 is expected to be relatively small, and therefore, the change unit 24 shortens the length of the first time range and extends the length of the second time range.

The control device 2 includes a determination unit 25. The determination unit 25 may be implemented as, for example, a microcontroller including a processor. The determination unit 25 determines the first time range and the second time range according to the relationship between the power consumed by the plurality of loads 71, 72 and the time range.

The determination unit 25, for example, obtains, over multiple days, information about power consumption rates of the plurality of loads 71, 72 for each time range (for example, on an hourly basis). The determination unit 25 sets the time range in which the power consumption rates of the plurality of loads 71, 72 are relatively high as the first time range, and sets the time range in which the power consumption rates of the plurality of loads 71, 72 are relatively low as the second time range.

The control system 10 further includes a remote controller 5 (hereinafter simply referred to as a "remote"). The remote 5 is a device allowing the user to operate the control device 2. The remote 5 communicates with the control device 2 using radio waves or infrared rays as a propagation medium. The remote 5 includes a presentation unit 51, a guidance unit 52, and an operating unit 53.

The remote 5 includes, as its major constituent element, a microcontroller including one or more processors and one or more memories. That is to say, the function of the remote 5 is performed by making the processor of the microcontroller execute a program stored in the memory of the microcontroller. The program may be stored in advance in the memory, downloaded via a telecommunications line such as the Internet, or distributed after having been stored in a non-transitory storage medium such as a memory card.

The presentation unit 51 may be implemented as, for example, a display. The presentation unit 51 presents information provided by the control device 2 by displaying the information on the display serving as the presentation unit 51.

The presentation unit 51 presents the information about whether the state of the control unit 21 is in the first mode or the second mode.

Moreover, the presentation unit 51 presents information in accordance with an end time of the first time range and a remaining capacity of the storage battery SB1. In more detail, the presentation unit 51 presents correlation between information regarding the end time of the first time range and the remaining capacity of the storage battery SB1. That is, the control device 2 obtains the remaining capacity of the storage battery SB1 from the storage battery SB1 through a communication line, and estimates, based on the actual discharge rate per unit time of the storage battery SB1, the time at which the remaining capacity of the storage battery SB1 will go zero. The control device 2 outputs, to the presentation unit 51, the information about whether the estimated time is before or after the end time of the first time range. In other words, the control device 2 outputs, to the presentation unit 51, information about whether the remaining capacity of the storage battery SB1 will run out or not by the end time of the first time range. For example, the presentation unit 51 displays the end time of the first time range and the estimated time at which the remaining capacity of the storage battery SB1 will run out. These times, for example, may be displayed at all times during the first time range, or may be displayed in response to a predetermined operation performed on the operating unit 53. The user of the power system 1 may try, for example, based on the information presented on the presentation unit 51, to save electricity when the user determines that the estimated time at which the remaining capacity of the storage battery SB1 will run out is before the end time of the first time range.

The presentation unit 51 may present the end time of the first time range and the remaining capacity of the storage battery SB1 as the information in accordance with the end time of the first time range and the remaining capacity of the storage battery SB1. In the present embodiment, the presentation unit 51 presents the end time of the first time range, the remaining capacity of the storage battery SB1, and the estimated time at which the remaining capacity of the storage battery SB1 will run out.

The guidance unit 52 may be implemented as, for example, a display. The display serving as the guidance unit 52 may also be used as the presentation unit 51. The guidance unit 52, for example, obtains weather information from the control device 2. The guidance unit 52 prompts the user to change at least one of the first time range or the second time range according to the weather information. For example, if the weather forecast predicts a fair weather and the amount of insolation is expected to be relatively large, the amount of electricity produced by the photovoltaic cell PV1 is expected to be relatively large, and therefore, the guidance unit 52 displays a message suggesting extending the length of the first time range and shortening the length of the second time range. On the other hand, for example, if the weather forecast predicts a rain and the amount of insolation is expected to be relatively small, the amount of electricity produced by the photovoltaic cell PV1 is expected to be relatively small, and therefore, the guidance unit 52 display a message suggesting shortening the length of the first time range and extending the length of the second time range.

In the present embodiment, if the function of one of the change unit 24 or the guidance unit 52 is turned on, the function of the other unit is turned off. Whether the function to turn on is the function of the change unit 24 or that of the guidance unit 52 is determined by the user's command entered through the operating unit 53 of the remote 5.

The operating unit 53, for example, includes a plurality of buttons. The user may change, by operating the operating unit 53, the contents displayed on the display serving as the presentation unit 51 and the guidance unit 52. Moreover, when the user operates the operating unit 53, a command signal is output to the control device 2 from the remote 5, and various settings with respect to the operation of the control device 2 are made. The operating unit 53 may include a touchscreen panel. Optionally, the touchscreen panel may also be used as the display serving as the presentation unit 51 and the guidance unit 52.

Figure 2:
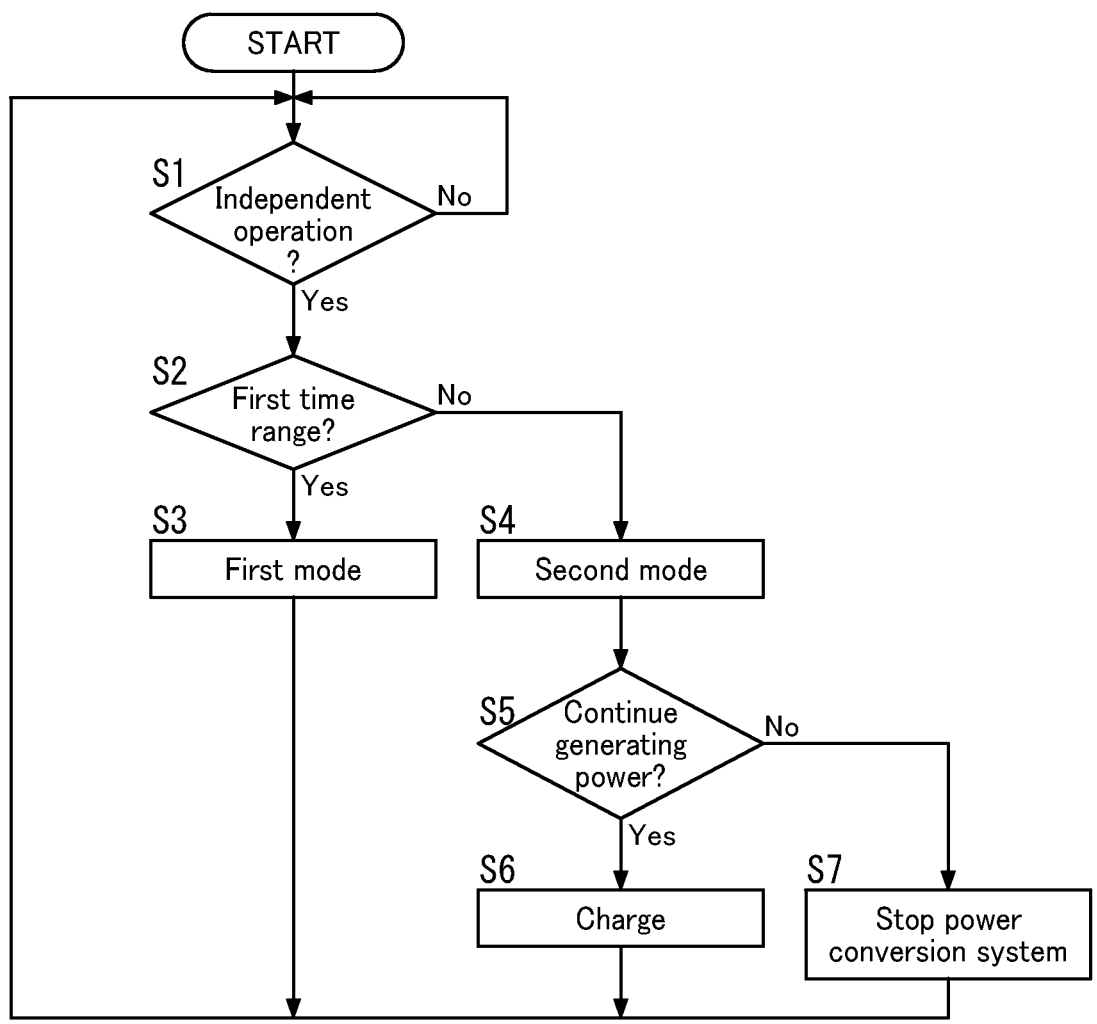
FIG. 2 is a flowchart showing an exemplary operation of the power system.

Next, the operation of the power system 1 will be described in order with reference to FIG. 2.

The control unit 21 obtains information from the inverter circuit 33 about whether or not the inverter circuit 33 is performing the independent operation (in Step S1). If the inverter circuit 33 is performing the independent operation (if the answer is Yes in Step S1), the control unit 21 determines, based on the time measured by the timer 22, whether or not the current time is in the first time range (in Step S2).

In this example, it is assumed that the time range other than the first time range is the second time range. If the current time is in the first time range (if the answer is Yes in Step S2), the control unit 21 operates in the first mode. In other words, the power is supplied to the plurality of loads 71, 72 from the inverter circuit 33.

If the current time is not in the first time range but in the second time range (if the answer is No in Step S2), the control unit 21 operates in the second mode (in Step S4). Moreover, the control unit 21 determines whether or not the photovoltaic cell PV1 continues generating power (in Steps S5). Specifically, based on the information obtained from the first converter circuit 31, the control unit 21 determines whether or not the photovoltaic cell PV1 is outputting DC power.

If the photovoltaic cell PV1 continues generating power (if the answer is Yes in Step S5), the control unit 21 controls the first converter circuit 31 and the second converter circuit 32 to charge the storage battery SB1 with the output power of the photovoltaic cell PV1 (in Step S6). If the photovoltaic cell PV1 does not continue generating power (if the answer is No in Steps S5), the control unit 21 stops the operation of the power conversion system 3 (in Step S7). In other words, the control unit 21 stops the operation of the first converter circuit 31, the second converter circuit 32, and the inverter circuit 33.

Next, an exemplary procedure for setting the first time range and the second time range in the power system 1 will be described with reference to FIGS. 3-8. FIGS. 3-8 show screen images displayed on the display serving as the presentation unit 51 and the guidance unit 52 of the remote 5. If the user operates the operating unit 53 of the remote 5, the screen image on the display switches. The user may change the operation mode of the power system 1 by operating the operating unit 53 of the remote 5.

Figure 3:
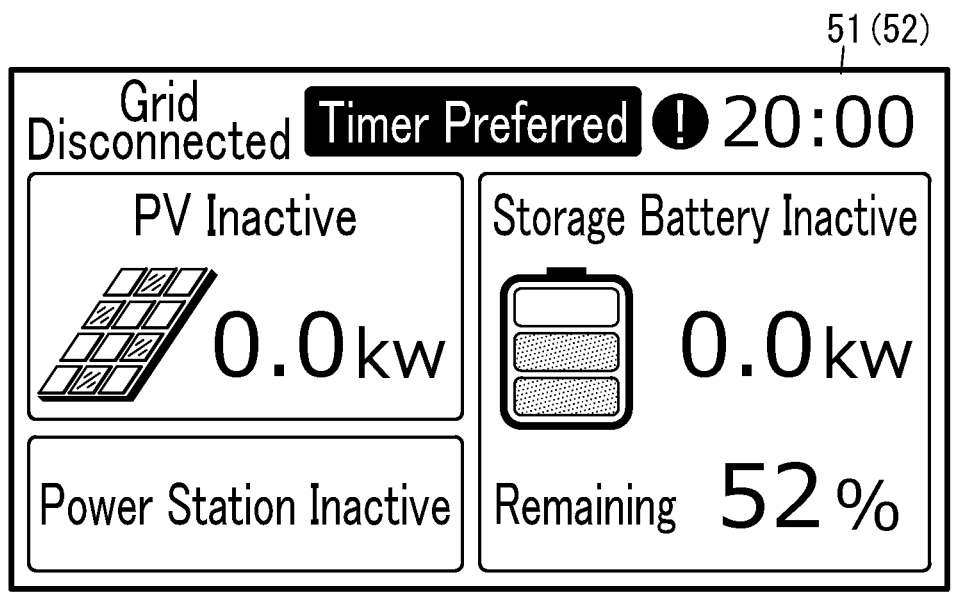
FIG. 3 shows a screen image displayed on the display of a remote of the power system.

FIG. 3 is a screen image showing the operating state of the power system 1. This screen image indicates whether or not the inverter circuit is performing the grid-connected operation, the current time, the quantity of electricity produced by the photovoltaic cell PV1, whether the power conversion system 3 (power station) is operating or not, the remaining capacity of the storage battery SB1, and other pieces of information. On the screen, "timer preferred" means a state in which the control unit 21 switches, depending on the time, between the first mode and the second mode.

Figure 4:
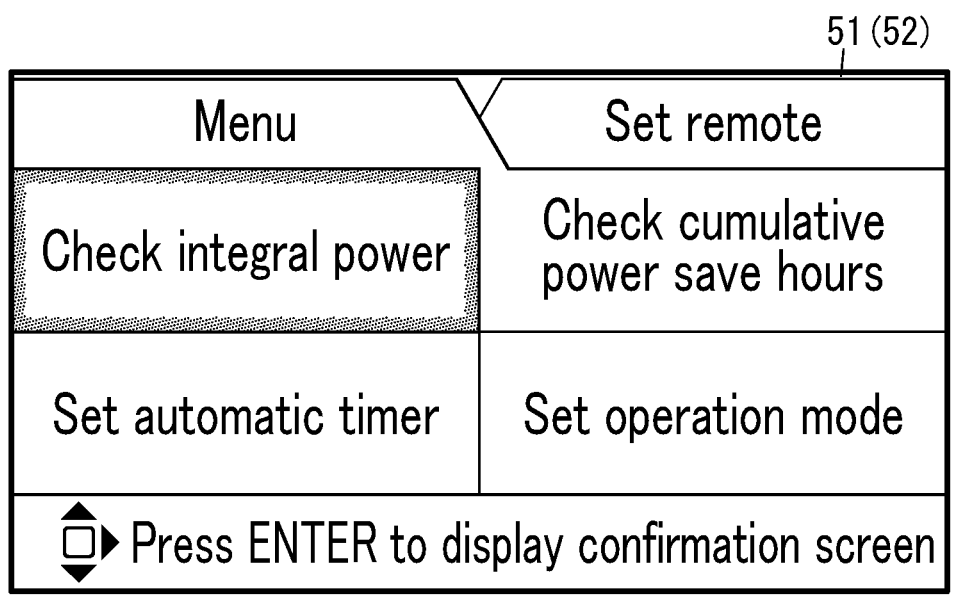
FIG. 4 shows another screen image displayed on the display of the remote of the power system.
Figure 5:
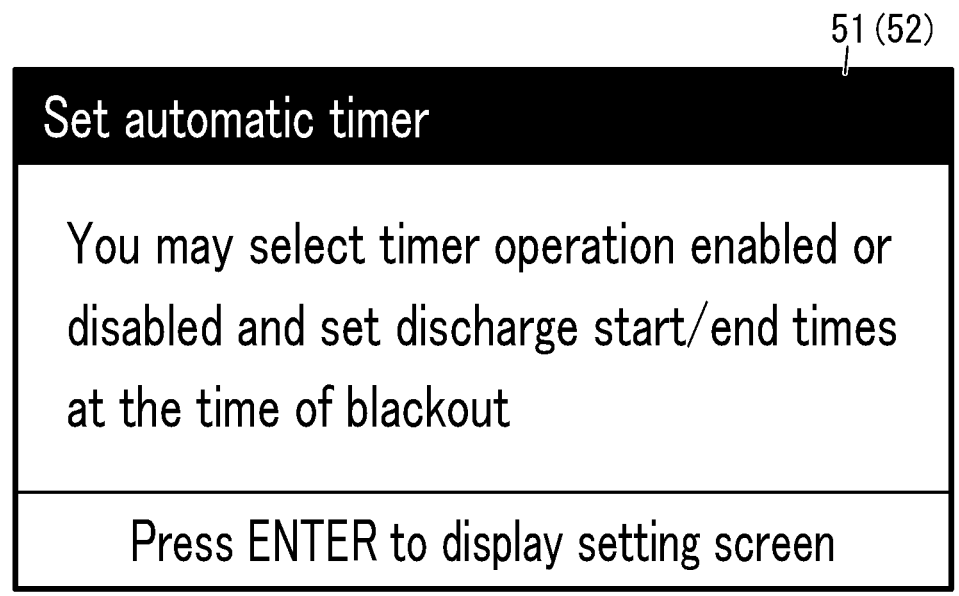
FIG. 5 shows another screen image displayed on the display of the remote of the power system.

When the screen image of FIG. 3 is displayed and the user performs a predetermined operation on the operating unit 53, a menu screen shown in FIG. 4 will be displayed. The user may select one of the items displayed on the screen by operating the operating unit 53. If the user selects "set automatic timer," a confirmation screen image shown in FIG. 5 will be displayed. The description of a specific operation that may be selected on "set automatic timer" is displayed on the confirmation screen.

Figure 6:
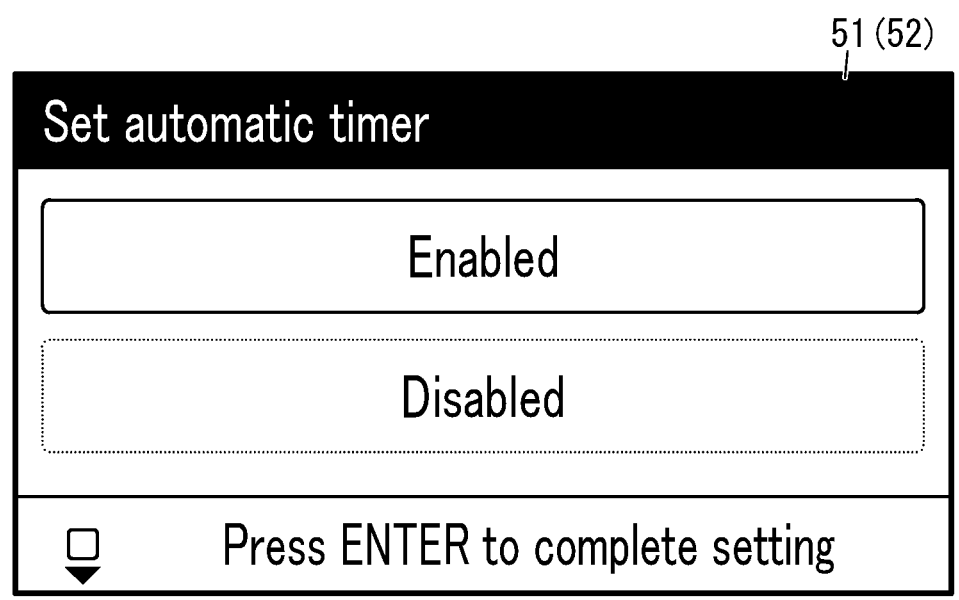
FIG. 6 shows another screen image displayed on the display of the remote of the power system.

When the confirmation screen is displayed and the user performs a predetermined operation on the operating unit 53, a selection screen shown in FIG. 6 will be displayed. The user may selectively enable or disable an automatic timer by operating the operating unit 53. The state in which the automatic timer is enabled corresponds to the first state in which the control unit 21 is in the first mode in the first time range and in the second mode in the second time range. The state in which the automatic timer is disabled corresponds to the second state in which the control unit 21 operates only in the first mode out of the first mode and the second mode.

Figure 7:
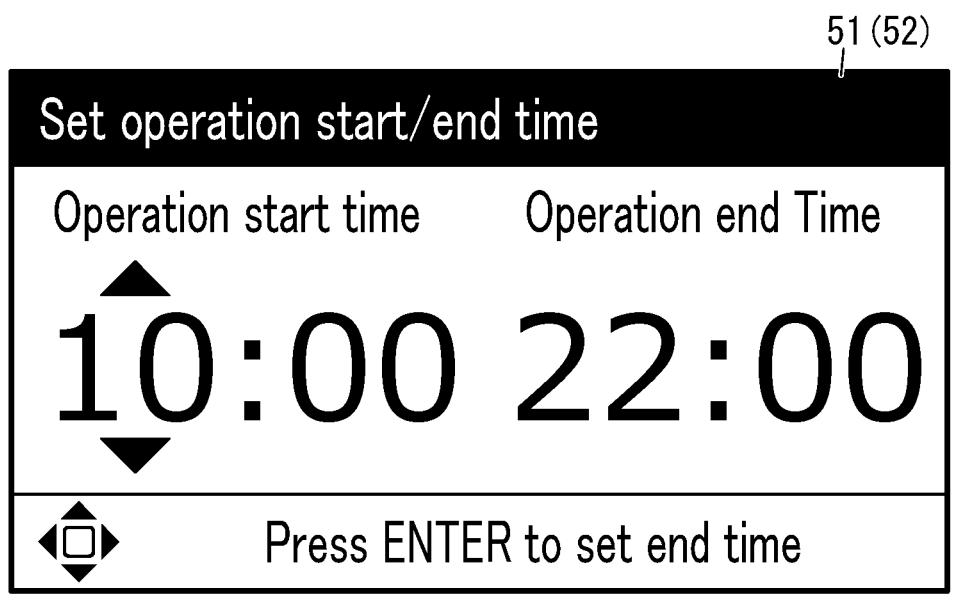
FIG. 7 shows another screen image displayed on the display of the remote of the power system.

If the user operates the operating unit 53 to select the state in which the automatic timer is enabled, a setting screen shown in FIG. 7 will be displayed. The user may set a start time and an end time of the first time range by operating the operating unit 53.

Figure 8:
FIG. 8 shows another screen image displayed on the display of the remote of the power system.

If the user sets the start time and the end time of the first time range, a screen image indicating that the automatic timer setting has been accepted is displayed as shown in FIG. 8, and the start time and the end time of the first time range are entered. On the other hand, in the selection screen shown in FIG. 6, when the user operates the operating unit 53 to select the state in which the automatic timer is disabled, the screen image shown in FIG. 8 will be displayed and the automatic timer is set as the disabled state. On the display, after the screen image shown in FIG. 8 is displayed, a screen image indicating the operating state of the power system 1 (see FIG. 3) will be displayed.

Variations of Embodiment

Next, variations of the exemplary embodiment will be enumerated one after another. Note that the variations to be described below may be adopted in combination as appropriate.

The same function as that of the control system 10 may be implemented as a method for controlling the power conversion system 3, a program, or a non-transitory storage medium that stores the program thereon, for example. A control method according to an aspect includes, when an inverter circuit 33 performs an independent operation, controlling, in a first time range, the power conversion system 3 in a first mode. The control method also includes, when the inverter circuit 33 performs the independent operation, controlling, in a second time range different from the first time range, the power conversion system 3 in a second mode. The control method includes having, in the first mode, an AC voltage applied across a plurality of terminals 331. The control method includes control of stopping, in the second mode, an operation of having the AC voltage applied across the plurality of terminals 331.

A program according to another aspect is designed to cause a computer to perform the control method described above.

The power system 1 according to the present disclosure includes a computer system. The computer system includes, as principal hardware components, a processor and a memory. The functions of the power system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, the plurality of constituent elements (or the functions) of the power system 1 are integrated together in a single housing. However, this is not an essential configuration for the power system 1 and should not be construed as limiting. Alternatively, those constituent elements (or functions) of the power system 1 may be distributed in multiple different housings. For example, the first converter circuit 31, the second converter circuit 32, and the inverter circuit 33 may be integrated together in a single housing or distributed in multiple different housings, whichever is appropriate. Still alternatively, at least some functions of the power system 1 may be implemented as a cloud computing system as well.

Conversely, in the first embodiment, at least some functions, distributed in multiple devices, of the power system 1 may be integrated together in a single housing. For example, some functions, distributed in the control device 2 and the remote controller 5, of the power system 1 may be integrated together in a single housing.

Instead of the photovoltaic cell PV1 and the storage battery SB1, a power generation facility such as a hydroelectric power generation facility, a wind power generation facility, a biomass power facility, or a fuel cell may be connected to the power conversion system 3. The power generation facility is preferably a distributed power source. Moreover, only one DC power supply, selected from the power generation facility such as the photovoltaic cell PV1 and the storage battery SB1, may be connected to the power conversion system 3.

In the embodiment, if the photovoltaic cell PV1 (power generation facility) is outputting DC power, the control unit 21 has the power supplied to the storage battery SB1 from the photovoltaic cell PV1 in the second time range. However, this is only an example and should not be construed as limiting. Alternatively, in the second time range, if the photovoltaic cell PV1 is outputting DC power, the control unit 21 may have the power conversion system 3 perform a predetermined operation. The predetermined operation is at least one of the following first to third operations. The first operation is the operation of having the power supplied to the storage battery SB1 from the photovoltaic cell PV1. The second operation is the operation of having the power supplied to the plurality of loads 71, 72 from the photovoltaic cell PV1. The third operation is the operation of having the power supplied to the plurality of loads 71, 72 from the photovoltaic cell PV1 and having the surplus electricity of the photovoltaic cell PV1 supplied to the storage battery SB1. When making the power conversion system 3 perform the second operation, the control unit 21 has the AC voltage applied across the plurality of terminals 331 even if it is in the second time range.

In other words, in the second time range, the control performed by the control unit 21 in the second mode may include at least one of the first to third operations described above.

Furthermore, to prevent a voltage from being applied across the plurality of terminals 331, the control unit 21 may stop the operation of only one or two circuits selected from the first converter circuit 31, second converter circuit 32, and the inverter circuit 33.

Furthermore, the first time range and the second time range may each include a plurality of time ranges. For example, the first time range may include a time range from 8:00 a.m. to 10:00 a.m. and a time range from 6:00 p.m. to 10:00 p.m.

Furthermore, the function of the remote 5 allowing the user to operate the control device 2 may be provided for the control device 2. In other words, the user may not only operate the remote 5 but also directly operate the control device 2.

Optionally, the power system 1 may also be used as an off-grid system which operates without being connected to the power grid PS1. If the power system 1 is disconnected from the power grid PS1, it means that power supply to the plurality of loads 71, 72 from the power grid PS1 has stopped.

(Recapitulation)

The embodiment and its variations described above may be specific implementations of the following aspects of the present disclosure.

A control system 10 according to a first aspect includes a control unit 21 for controlling a power conversion system 3. The power conversion system 3 includes an inverter circuit 33. The inverter circuit 33 performs a grid-connected operation and an independent operation. When performing the grid-connected operation, the inverter circuit 33 is allowed to convert DC power supplied from a DC power supply (photovoltaic cell PV1 and storage battery SB1) into AC power and output the AC power thus converted to a power grid PS1. When performing the independent operation, the inverter circuit 33 is allowed to output, via a terminal 331, the AC power converted to a load 71 (and 72) disconnected from the power grid PS1. When the inverter circuit 33 performs the independent operation, the control unit 21 controls, when operating in a first mode, the power conversion system 3 in a first time range such that an AC voltage is applied to the terminal 331, and controls, when operating in a second mode, the power conversion system 3 in a second time range different from the first time range. The second mode includes control of stopping an operation of having the AC voltage applied to the terminal 331.

According to this configuration, making the control unit 21 stop performing the operation of having the AC voltage applied to the terminal 331 in the second time range allows the power consumption of the power conversion system 3 to be cut down, compared to having the AC voltage applied to the terminal 331 even though no power is consumed by the loads 71 (and 72).

In a control system 10 according to a second aspect, which may be implemented in conjunction with the first aspect, the control unit 21 stops operation of the inverter circuit 33 in the second mode.

This configuration allows the power consumption of the inverter circuit 33 to be cut down in the second mode.

In a control system 10 according to a third aspect, which may be implemented in conjunction with the first or second aspect, the DC power supply includes a storage battery SB1 and a power generation facility (photovoltaic cell PV1). The control unit 21 makes the power conversion system 3 perform a predetermined operation while the power generation facility is outputting DC power in the second time range.

This configuration makes the power generated by the power generation facility available more frequently than in a situation where the control unit 21 stops running the power conversion system 3 even though the power generation facility (photovoltaic cell PV1) is outputting DC power in the second time range.

In a control system 10 according to a fourth aspect, which may be implemented in conjunction with the third aspect, the predetermined operation is at least one of: an operation of having power supplied from the power generation facility (photovoltaic cell PV1) to the storage battery SB1; an operation of having power supplied from the power generation facility to the load 71 (and 72); or an operation of having power supplied from the power generation facility to the load 71 (and 72) and having surplus electricity of the power generation facility supplied to the storage battery SB1.

This configuration allows the power generated by the power generation facility (photovoltaic cell PV1) to be made effective use of with the power consumption of the power conversion system 3 cut down.

A control system 10 according to a fifth aspect, which may be implemented in conjunction with any one of the first to fourth aspects, further includes a switching unit 23. The switching unit 23 switches the control unit 21 between two states that are a first state and a second state. In the first state, the control unit 21 operates in the first mode in the first time range and operates in the second mode in the second time range. In the second state, the control unit 21 operates only in the first mode, out of the first mode and the second mode.

This configuration allows, when the control unit 21 is in the second state, the loads 71 (and 72) to be supplied with power in the first mode even if the current time falls within the second time range, thus satisfying demands for supplying power to the loads 71 (and 72) in a broader time range.

In a control system 10 according to a sixth aspect, which may be implemented in conjunction with any one of the first to fifth aspects, at least one of the first time range or the second time range is set on a predetermined period basis.

This configuration allows the loads 71 (and 72) to be selectively supplied with power according to the needs on a predetermined period (e.g., day of the week, season, etc.) basis.

A control system 10 according to a seventh aspect, which may be implemented in conjunction with any one of the first to sixth aspects, further includes a presentation unit 51. The presentation unit 51 presents information indicating whether the control unit 21 is operating in the first mode or the second mode.

This configuration allows the user to use the loads 71 (and 72) in accordance with the information.

In a control system 10 according to an eighth aspect, which may be implemented in conjunction with the seventh aspect, the DC power supply includes a storage battery SB1. The presentation unit 51 presents the information in accordance with an end time of the first time range and a remaining capacity of the storage battery SB1.

This configuration provides the user with information for determining whether or not the remaining capacity of the storage battery SB1 will run out by the end time of the first time range.

A control system 10 according to a ninth aspect, which may be implemented in conjunction with any one of the first to eighth aspects, further includes at least one of a guidance unit 52 or a change unit 24. The guidance unit 52 prompts a user to change at least one of the first time range or the second time range according to weather information. The change unit 24 changes at least one of the first time range or the second time range according to the weather information.

This configuration allows the loads 71 (and 72) to be selectively supplied with power according to the needs that vary depending on the weather condition.

A control system 10 according to a tenth aspect, which may be implemented in conjunction with any one of the first to ninth aspects, further includes a determination unit 25. The determination unit 25 determines the first time range and the second time range according to a relationship between power consumed by the load 71 (and 72) and a time range.

This configuration allows the first time range and the second time range to be determined according to the need to supply power to the loads 71 (and 72).

Note that the constituent elements other than those of the first aspect are not essential constituent elements for the control system 10 but may be omitted as appropriate.

A power system 1 according to an eleventh aspect includes the control system 10 according to any one of the first to tenth aspects, and a power conversion system 3.

This configuration allows the power consumption of the power conversion system 3 to be cut down.

A control method according to a twelfth aspect is a control method for controlling a power conversion system 3. The power conversion system 3 includes an inverter circuit 33. The inverter circuit 33 performs a grid-connected operation and an independent operation. When performing the grid-connected operation, the inverter circuit 33 is allowed to convert DC power supplied from a DC power supply (photovoltaic PV1 and storage battery SB1) into AC power and output the AC power thus converted to a power grid PS1. When performing the independent operation, the inverter circuit 33 is allowed to output, via a terminal 331, the AC power converted to a load 71 (and 72) disconnected from the power grid PS1. This control method includes controlling, when the inverter circuit 33 performs the independent operation, the power conversion system 3 differently in a first time range and in a second time range, which is different from the first time range. Specifically, the control method includes: controlling, in the first time range, the power conversion system 3 in a first mode in which an AC voltage is applied to the terminal 331; and controlling, in the second time range, the power conversion system 3 in a second mode including control of stopping an operation of having the AC voltage applied to the terminal 331.

This configuration allows the power consumption of the power conversion system 3 to be cut down.

A program according to a thirteenth aspect causes a computer system to perform the control method of the twelfth aspect.

This configuration allows the power consumption of the power conversion system 3 to be cut down.

Note that these are not the only aspects of the present disclosure but various configurations of the control system 10 according to the exemplary embodiment (including its variations) may also be implemented as a control method and a program.

REFERENCE SIGNS LIST

1 Power System
10 Control System
21 Control Unit
23 Switching Unit
24 Change Unit
25 Determination Unit
3 Power Conversion System
33 Inverter Circuit
331 Terminal
51 Presentation Unit
52 Guidance Unit
71, 72 Load
PS1 Power Grid
PV1 Photovoltaic Cell (Power Generation Facility)
SB1 Storage Battery

The invention claimed is:

1. A control system comprising a control unit, the control unit being configured to control a power conversion system,
the power conversion system including an inverter circuit, the inverter circuit being configured to perform:
a grid-connected operation in which the inverter circuit is allowed to convert DC power supplied from a DC power supply into AC power and output the AC power thus converted to a power grid; and
an independent operation in which the inverter circuit is allowed to output, via a terminal, the AC power converted to a load disconnected from the power grid,
the control unit being configured to, when the inverter circuit performs the independent operation,
operate in a first mode when a present time is in a first time range,
wherein in the first mode, the power conversion system is controlled such that an AC voltage is applied to the terminal, and
operate in a second mode when the present time is in a second time range different from the first time range, wherein in the second mode, the power conversion system is controlled to stop an operation of having the AC voltage applied to the terminal, and
in the second mode, the control unit stops the inverter circuit.

2. The control system of claim 1, wherein
the DC power supply includes a storage battery and a power generation facility, and
the control unit is configured to make the power conversion system perform a predetermined operation while the power generation facility is outputting DC power in the second time range.

3. The control system of claim 2, wherein
the predetermined operation is at least one of: an operation of having power supplied from the power generation facility to the storage battery; an operation of having power supplied from the power generation facility to the load; or an operation of having power supplied from the power generation facility to the load and having surplus electricity of the power generation facility supplied to the storage battery.

4. The control system of claim 1, further comprising a switching unit configured to switch the control unit between two states that are a first state and a second state,
the control unit being configured to operate, in the first state, in the first mode in the first time range and in the second mode in the second time range,
the control unit being configured to operate, in the second state, only in the first mode, out of the first mode and the second mode.

5. The control system of claim 1, wherein
at least one of the first time range or the second time range is set on a predetermined period basis.

6. The control system of claim 1, further comprising a presentation unit configured to present information indicating whether the control unit is operating in the first mode or the second mode.

7. The control system of claim 6, wherein the DC power supply includes a storage battery, and
   the presentation unit is configured to present the information in accordance with an end time of the first time range and a remaining capacity of the storage battery.

8. The control system of claim 1, further comprising at least one of a guidance unit or a change unit,
   the guidance unit being configured to prompt a user to change at least one of the first time range or the second time range according to weather information,
   the change unit being configured to change at least one of the first time range or the second time range according to the weather information.

9. The control system of claim 1, further comprising a determination unit configured to determine the first time range and the second time range according to a relationship between power consumed by the load and a time range.

10. A power system comprising:
    the control system of claim 1; and
    the power conversion system.

11. A control method for controlling a power conversion system, the power conversion system including an inverter circuit, the inverter circuit being configured to perform:
    a grid-connected operation in which the inverter circuit is allowed to convert DC power supplied from a DC power supply into AC power and output the AC power thus converted to a power grid; and
    an independent operation in which the inverter circuit is allowed to output, via a terminal, the AC power converted to a load disconnected from the power grid,
    the control method comprising, when the inverter circuit performs the independent operation,
    operating in a first mode when a present time is in a first time range, wherein in the first mode, the power conversion system is controlled such that an AC voltage is applied to the terminal, and
    operating in a second mode when the present time is in a second time range different from the first time range, wherein in the second mode, the power conversion system is controlled to stop an operation of having the AC voltage applied to the terminal,
    in the second mode, the inverter circuit stops.

12. A non-transitory computer-readable storage medium storing a computer program designed to cause a computer system to perform the control method of claim 11.

* * * * *